(No Model.) 5 Sheets—Sheet 3.

W. H. BEVANS.
GUN CARRIAGE.

No. 605,376. Patented June 7, 1898.

Witnesses
Percy C. Bowen
John Chalmers Hulley

Inventor
W. H. Bevans
by Wilkinson & Fisher
Attorneys (No Model.) 5 Sheets—Sheet 4.
W. H. BEVANS.
GUN CARRIAGE.
No. 605,376. Patented June 7, 1898.
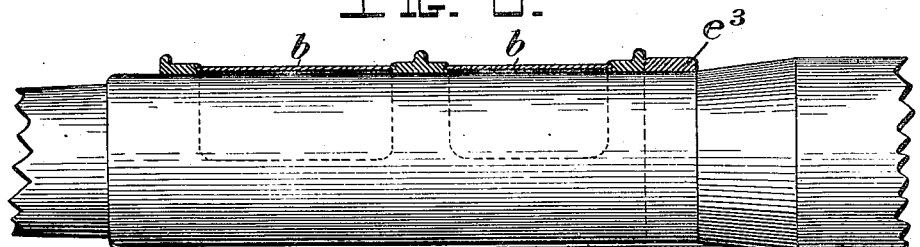
FIG. 6.
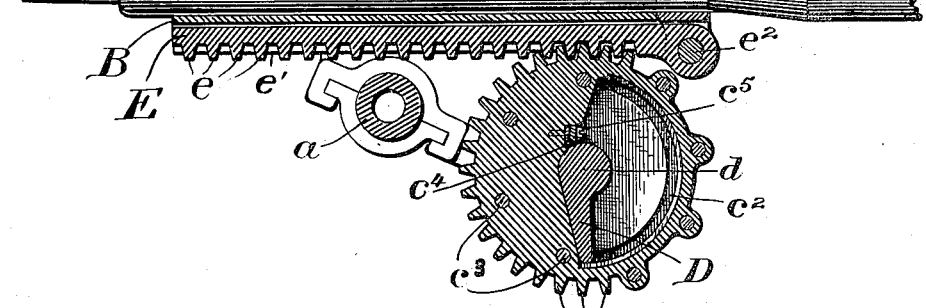
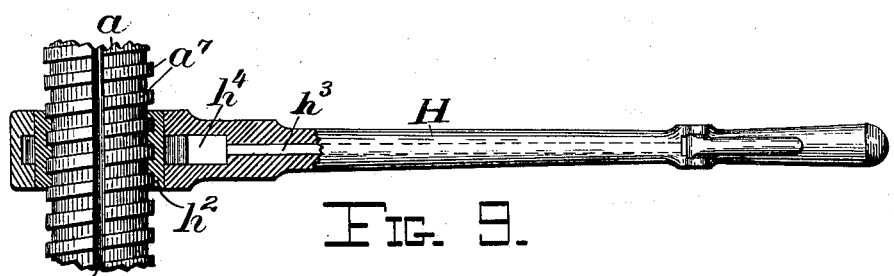
FIG. 8.
FIG. 9.
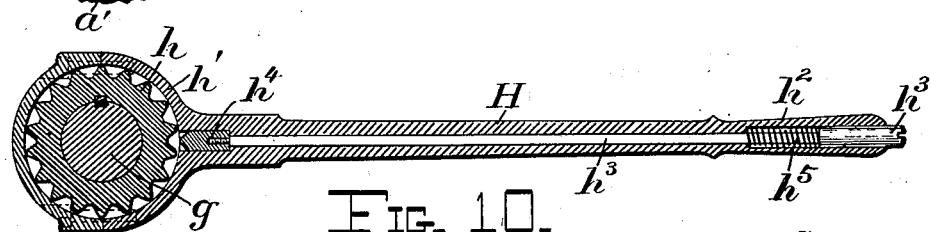
FIG. 10.
Witnesses
Inventor
W. H. Bevans
by Wilkinson & Fisher
Attorneys (No Model.) 5 Sheets—Sheet 5.

W. H. BEVANS.
GUN CARRIAGE.

No. 605,376. Patented June 7, 1898.

Witnesses
Percy C. Bowen
John Chalmers Wiley

Inventor
W. H. Bevans
by Wilkinson & Fisher
Attorneys

UNITED STATES PATENT OFFICE.

WILLIAM H. BEVANS, OF WASHINGTON, DISTRICT OF COLUMBIA.

GUN-CARRIAGE.

SPECIFICATION forming part of Letters Patent No. 605,376, dated June 7, 1898.

Application filed September 23, 1897. Serial No. 652,757. (No model.)

*To all whom it may concern:*

Be it known that I, WILLIAM H. BEVANS, a citizen of the United States, residing at Washington, in the District of Columbia, have invented certain new and useful Improvements in Ordnance; and I do hereby declare the following to be a full, clear, and exact description of the invention, such as will enable others skilled in the art to which it appertains to make and use the same.

My invention relates to an improvement in ordnance, and especially to recoil mechanism, elevating and depressing mechanism, and training mechanism.

It consists in the construction and combinations of parts, as hereinafter described, and particularly pointed out in the claims.

Figure 1:
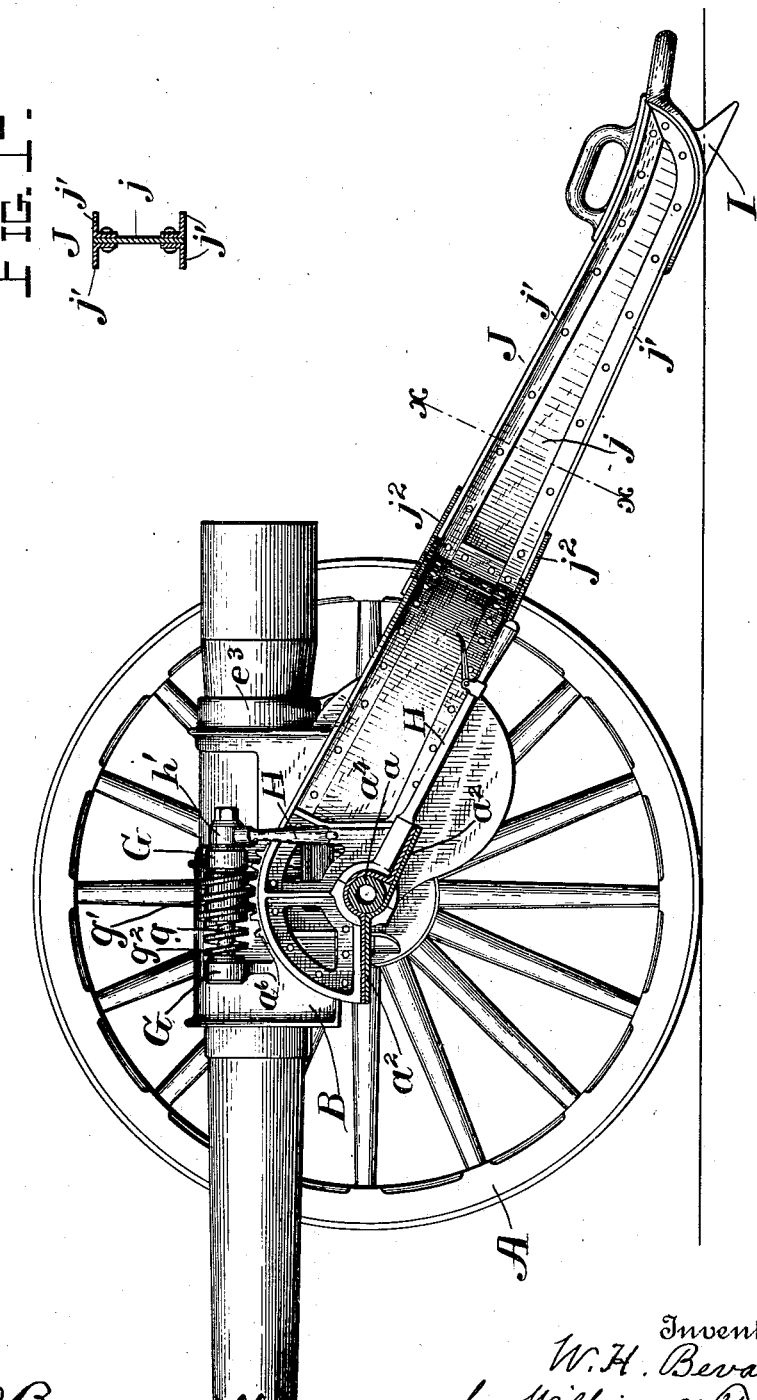
Figure 2:
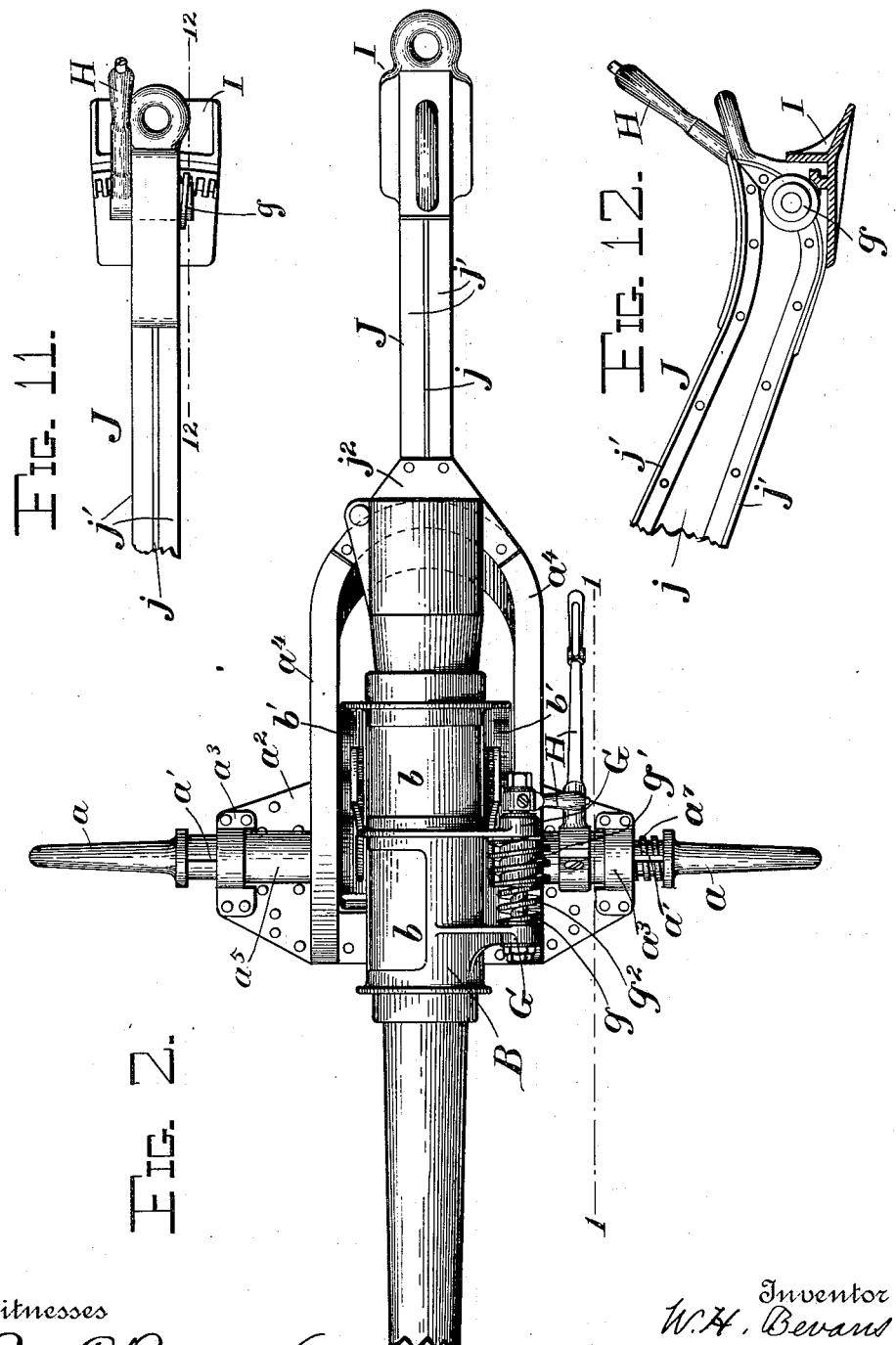
Figure 3:
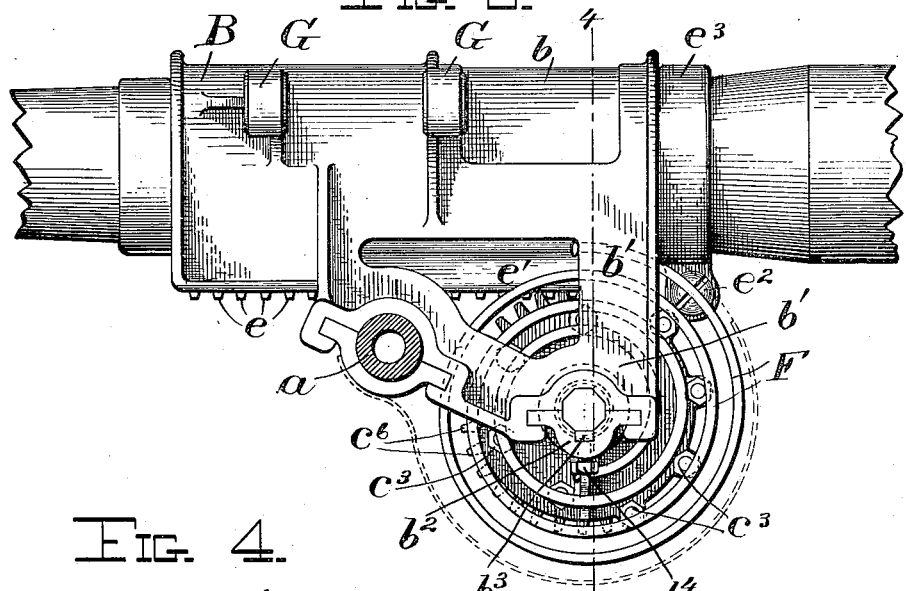
Figure 4:
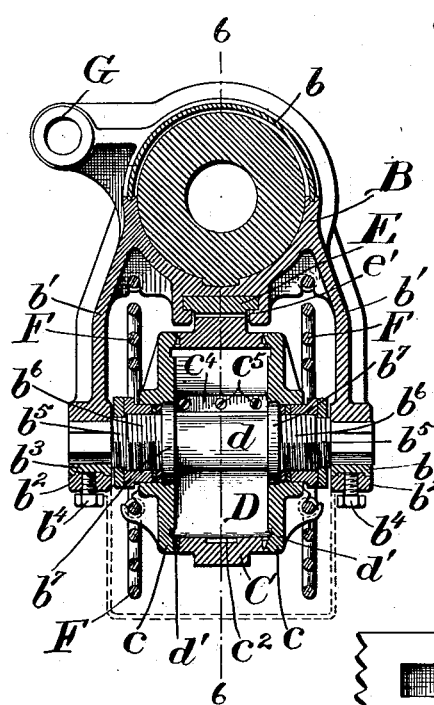
Figure 5:
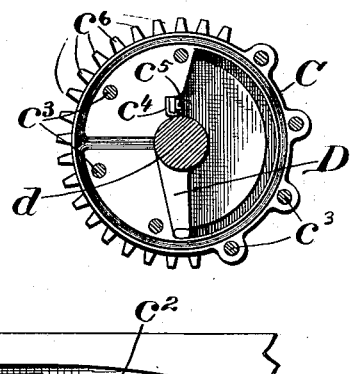
Figure 7:
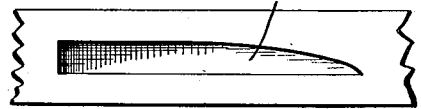
Figure 13:
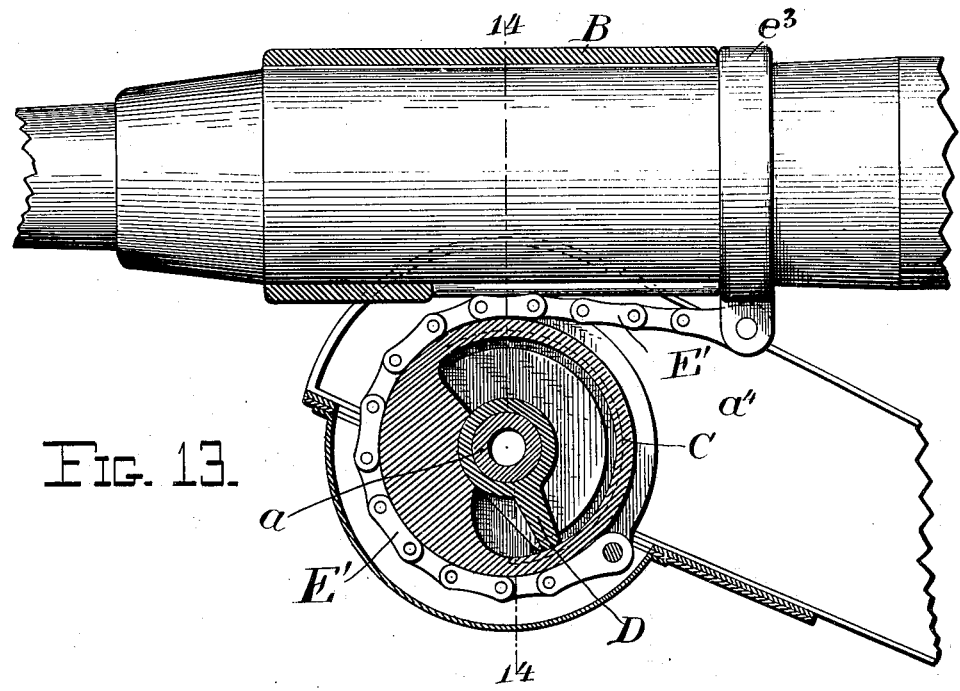
Figure 14:
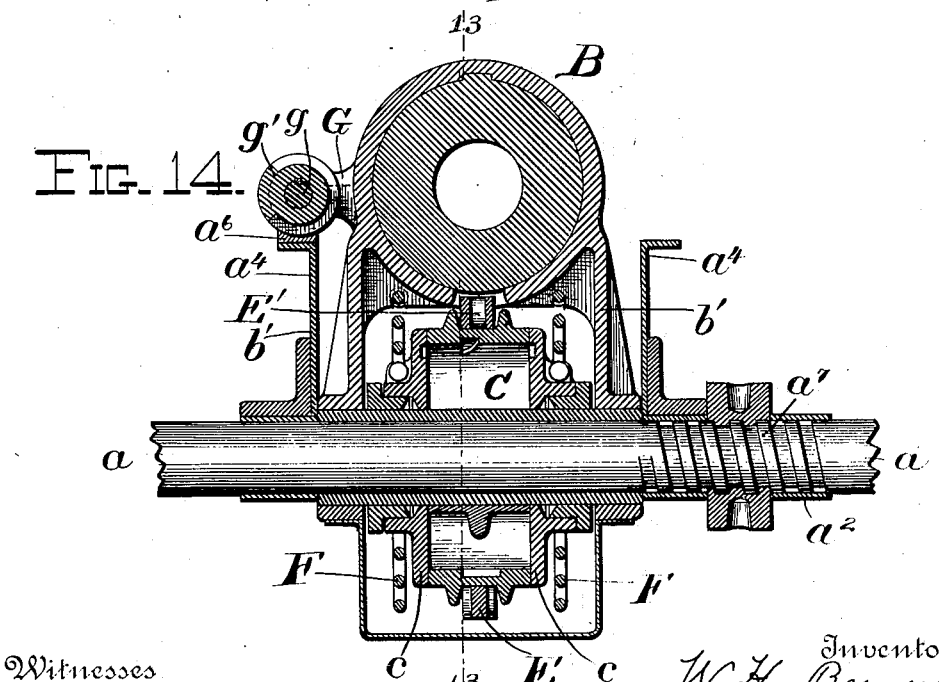

Referring to the drawings, Figure 1 is a section of a gun, showing my improvements, the section being taken on the line 1 1 of Fig. 2. Fig. 1$^a$ is a section along the line $x$ $x$ of Fig. 1. Fig. 2 is a top plan view of my invention, the wheels of the carriage being removed. Fig. 3 is a detail view showing the recoil mechanism on an enlarged scale. Fig. 4 is a transverse vertical section of said recoil mechanism, taken on the line 4 4 of Fig. 3. Fig. 5 is a side view of the recoil-cylinder with one head removed, the shaft of the piston being shown in section. Fig. 6 is a longitudinal section of the recoil mechanism, taken on the line 6 6 of Fig. 4. Fig. 7 is a view showing the groove which is cut in the interior of the recoil-cylinder. Fig. 8 is a longitudinal sectional view of the ratchet-and-pawl mechanism used in training the gun from side to side. Fig. 9 is a top view of the same, partly in section. Fig. 10 is a longitudinal section of a modified form of said ratchet mechanism. Fig. 11 is a fragmentary view showing the form of training mechanism which is applied to the lower end of the trail. Fig. 12 is a side view of the same, the spade being shown in section. Fig. 13 is a transverse sectional view of a modified form of recoil mechanism, taken on the line 13 13 of Fig. 14; and Fig. 14 is a transverse sectional view of the same, taken on the line 14 14 of Fig. 13.

A represents the wheels of an ordinary gun-carriage, mounted on the axle $a$. This axle has an enlarged portion immediately inside of the wheels, which enlarged portion extends from hub to hub and is provided with a groove or keyway $a'$ in its upper surface. Mounted upon this enlarged portion of the axle is a plate $a^2$, the forward part of which is horizontal and the rear part of which slopes downward and backward to conform to the inclination of the trail.

On each side near the wheels are straps $a^3$, which pass over the axle and are bolted to the plate $a^2$, one or both of which may have a downward projection fitting in the keyway $a'$. Upon the plate $a^2$ is mounted the flask $a^4$, which has a plate corresponding in shape and location to the plate $a^2$, which plates are bolted together. This flask also has an extension or sleeve $a^5$, which extends over the axle between the strap $a^3$ and the flask proper, $a^4$. The upper part of the flask $a^4$ is constructed in the usual manner—that is to say, it is curved nearly to the arc of a circle, and on one side thereof it is provided with a curved rack $a^6$, for a purpose to be hereinafter explained.

The trail is of peculiar construction, as shown in Figs. 1, 1$^a$, and 2. The flask, as shown therein, is, when viewed from above, shaped approximately like a horseshoe. To the center of the curve of this horseshoe is attached the trail proper, J. This in cross-section is practically in the form of an I-beam, consisting of the central plate $j$ and the side pieces $j'$. This, as said before, is bolted to the central part of the curve of the flask, and the junction of the flask and trail is strengthened by triangular pieces $j^2$, one above and one below, bolted to the flask and to the trail. This construction is of especial value in that it greatly reduces the weight of the trail without to any appreciable degree impairing its strength. By this construction, too, a very narrow foot is provided, so that said foot, and with it the trail, may be swung around by the gearing shown in Figs. 11 and 12, thus enabling the gun to be trained in a horizontal plane.

The gun itself is mounted in a heavy metal frame B, which in my preferred form of construction, as shown in Figs. 3 and 4, is mounted on the axle $a$. This frame B completely encircles the gun, as is shown in Fig. 4, except that parts of the frame are cut away on the top and sides, Figs. 2 and 4, and pieces of sheet metal $b$ are used to fill in the portions cut away for the purpose of reducing the weight. For the same reason an approximately triangular space is cut away on the side extensions of said frame, as shown in Fig. 3. These side extensions $b'$ extend downwardly and carry the recoil-cylinder C, which is one of the principal features of my invention. This cylinder is a short one and usually does not exceed in length the diameter of the gun at the point where it is supported by the frame B, and it is arranged with its axis at right angles to the axis of the gun, a point which is of great importance. Inside this cylinder is a piston D, which is stationary, while the recoil-cylinder C moves around it. This piston is mounted on the shaft $d$, which is supported in the extensions $b'$ of the frame B. The outer ends of this shaft D are polygonal in cross-section, and the apertures in the extensions $b'$ are similarly shaped to receive them. It is obvious that this arrangement might be reversed and that the cylinder might be stationary and the piston movable.

A strap $b^2$ engages the lower part of the extension $b'$ and together with said extension furnishes the bearings for said piston-shaft $d$. This strap has a cut-away part or groove located on the inside of said strap at its center, and in this groove is a key $b^3$, one at each end of the shaft, (shown in Figs. 3 and 4,) to hold the shaft $d$ firmly in place. Screws $b^4$ are used to hold these keys firmly in position. This piston-shaft has two screw-threaded portions at each end, $b^5$ and $b^6$, the latter being the larger, and a circular enlarged portion $b^7$ at each side, engaging in a cut-away portion in the ends $c$ of the cylinder C.

The piston D, which may or may not be made integral with the shaft $d$, is best shown in Fig. 6 and extends from the shaft $d$ to the wall of the cylinder. At its outer end it is provided with extensions $d'$, which fit into corresponding grooves in the cylinder-head. Suitable nuts engage the screw-threads $b^5$ and $b^6$, and packing is inserted between the enlargements $b^7$ and the nuts engaging the screw-threads $b^6$.

The cylinder-heads are shown in Fig. 4 with portions engaging the enlarged portions $b^7$ on the shaft $d$ and extending over the nuts engaging the screw-threads $b^6$. Approximately the forward half of the cylinder is made solid, as shown in Fig. 6. A groove $c^2$ of a peculiar shape, as shown in Fig. 7, is cut in the rear half of the cylinder C for a purpose presently to be described. One side of this groove is straight, and the other side is formed by a parabolic curve.

The cylinder-heads $c$ are firmly bolted to the cylinder C by bolts $c^3$. This cylinder in practice is filled with a suitable liquid, such as a mixture of water and glycerin. To prevent the liquid from leaking around the shaft $d$ when the gun is recoiling, a flexible strip $c^4$ is fastened by bolts $c^5$ to the solid part of the cylinder just above the shaft $d$ and between the extensions $b^7$ upon said shaft, the lower part resting loosely upon said shaft $d$ and preventing the escape of liquid around said shaft.

The cylinder C is provided with gear-teeth $c^6$ on the outer surface, which teeth extend a little more than half-way around said cylinder. These gear-teeth mesh with gear-teeth $e$ on the rack E, which slides in ways $e'$ in the frame B, as shown in Fig. 4. This rack is pivoted at $e^2$ to a ring $e^3$, shrunk upon the gun in rear of the frame B. The cylinder and piston, together with the rack and pinion and adjacent parts, constitute the recoil mechanism.

When the gun is fired, the shock causes it to travel backward, carrying with it the rack E, which, engaging the teeth on the cylinder C, causes said cylinder to revolve. This revolution is checked by the piston D and can only take place as the liquid contained in the cylinder escapes past the piston through the groove $c^2$. Strong spiral springs F, attached to the frame B and to the cylinder C, one on each side thereof, serve to return the gun to its normal position after firing. As said before, this recoil-cylinder is located with its axis at right angles to the axis of the gun. This permits the use of a very short cylinder, which is only about one-tenth as long as the usual recoil-cylinder and permits the weight to be greatly reduced, a fact which is of much importance in field service, for which my improved gun is especially designed.

I have described the recoil mechanism as mounted behind and slightly below the axle of the carriage. This arrangement is preferable, as it permits the gun to be placed lower down; but it is obvious that the recoil mechanism might be mounted either on the axle or in front of the same, if desired.

A modification of my recoil mechanism is shown in Figs. 13 and 14. In this modification the rack-and-pinion arrangement is replaced by a chain E', fastened to the ring $e^3$ and to the cylinder C. In this modification also the recoil-cylinder is mounted directly upon the axle of the gun. In both modifications the recoil-cylinder is inclosed in a sheet-metal casing. (Shown in Figs. 3 and 4 in dotted lines.)

The second part of my invention relates to means for elevating and depressing the gun. On one side of the frame B are extensions G. The outer part of these extensions is circular and perforated to form bearings for a shaft $g$, journaled therein. Splined on this shaft is a worm-gear $g'$, which meshes with the gear-teeth $a^6$ upon the flask. In front of the worm-gear is a strong spiral spring $g^2$ to relieve the strain upon the teeth when the gun is discharged. By operating this worm-gear it is obvious that the gun may be elevated or depressed. This worm-gear is operated by means of a ratchet mechanism. (Shown in detail in Fig. 10.) This ratchet mechanism consists of the ratchet $h$, fastened to the worm gear or shaft $g$, with a casing $h'$ surrounding it. This casing is extended and forms a handle H, which is perforated. Running through this handle is a rod $h^3$, the lower part or head of which, $h^4$, is pointed and adapted to engage when pressed inwardly with the teeth of the ratchet. The spring $h^5$ is inserted in an enlarged portion $h^2$ of the hollow handle and tends to keep the head $h^4$ out of engagement with the ratchet-teeth. When it is desired to operate the ratchet, the enlarged end of the rod $h^3$ is pressed downwardly with the thumb, whereupon the head $h^4$ engages with the ratchet-teeth, and the ratchet may be moved in either direction.

The third feature of my invention relates to the training of the gun in a horizontal plane. One part of the main axle is provided with screw-threads $a^7$. (See Figs. 2, 9, and 14.) Engaging these screw-threads is a ratchet-wheel $h^7$, the inner part of which is provided with a screw-thread engaging said screw-threaded portion of the axle and the outer part of which is provided with ratchet-teeth. This ratchet and accompanying mechanism are shown in detail in Figs. 8 and 9 and are similar to the ratchet mechanism shown in Fig. 10, with the exception that instead of being operated by the thumb a lever $h^6$ is pivoted in an extension on the hollow handle, which lever engages with the outer end of the shaft in the hollow handle. By working this ratchet the whole carriage is swung in a horizontal plane about the spade I as a center. It is obvious that by this mechanism the gun may be trained in a horizontal plane to a limited extent.

An additional training mechanism is shown in Figs. 11 and 12. In this case the ratchet mechanism is applied directly to the lower end of the trail, and it is obvious without any further description that by working the ratchet the gun may be swung in a horizontal plane in either direction.

I have not claimed herein the means for elevating, depressing, and training the gun, as these means form the subject-matter of another application, Serial No. 678,144, filed April 19, 1898.

Having thus described my invention, what I claim, and desire to secure by Letters Patent of the United States, is—

1. The combination of a gun, a fluid recoil-check located beneath and in close proximity to said gun, said gun directly actuating the mechanism of said recoil-check, said recoil-check being provided with a cylinder arranged substantially at right angles to the axis of the gun, substantially as described.

2. The combination of a gun, a fluid recoil-check located beneath and in close proximity to said gun, said recoil-check being provided with a rotatable cylinder arranged at substantially right angles to the axis of the gun, substantially as described.

3. The combination of a gun, a fluid recoil-check having a cylinder arranged substantially at right angles to the axis of the gun, and means for transmitting the recoil of the gun to said check causing said cylinder to rotate partially, substantially as described.

4. The combination of a gun, a fluid recoil-check provided with a cylinder located at substantially right angles to the axis of the gun, means for transmitting the recoil of the gun to said cylinder, causing the latter to rotate partially, and means for restoring the gun to its normal position, substantially as described.

5. The combination of a gun, a fluid recoil-check provided with a cylinder located substantially at right angles to the axis of the gun, and a stationary piston in said cylinder, substantially as described.

6. The combination of a gun, a recoil-check provided with a rotatable cylinder located at substantially right angles to the gun, a stationary piston in said cylinder, and means for rotating said cylinder by the recoil of the gun, substantially as described.

7. The combination of a gun, a recoil-check provided with a rotatable cylinder arranged at substantially right angles to the gun, a stationary piston in said cylinder, means for rotating said cylinder by the recoil of the gun, and means for restoring said gun to its normal position, substantially as described.

8. The combination with a gun, of a casing in which said gun is mounted and adapted to slide, a recoil-cylinder journaled in said casing at right angles to the gun, and means for transmitting the recoil of the gun to said cylinder, substantially as described.

9. The combination with a gun, of a casing in which said gun is mounted and adapted to slide, a recoil-cylinder journaled in said casing and provided with teeth upon its periphery, and a rack secured to said gun and adapted to engage with the teeth on said cylinder, so that the recoil of said gun will tend to rotate the cylinder, substantially as described.

10. The combination with a gun, of a casing in which said gun is mounted and adapted to slide, a recoil-cylinder journaled in said casing and provided with teeth on its periphery, a stationary piston in said cylinder, a rack secured to said gun and meshing with the teeth on said cylinder and means for restoring the gun to its normal position after firing, substantially as described.

11. The combination with a gun, of a casing in which said gun is mounted and adapted to slide, a recoil-cylinder journaled in said casing and provided with teeth on its periphery, said cylinder being provided with a groove in its inner surface, a stationary piston in said cylinder, a rack secured to said gun and engaging the teeth on said cylinder, and a ring shrunk onto the gun to which said rack is fastened, substantially as described.

12. The combination with a gun, of a casing in which said gun is mounted and adapted to slide, a recoil-cylinder journaled in said casing, means for transmitting the recoil of the gun to the said cylinder to cause the latter to rotate and spiral springs connected to said cylinder and said casing to restore the gun to its normal position after firing, substantially as described.

13. Recoil mechanism for guns, consisting of a stationary piston and shaft having screw-threaded and enlarged portions supporting said piston, supports for said shaft, a cylinder provided with gear-teeth on a part of its periphery inclosing said piston, stops in the interior of said cylinder to limit its motion, said cylinder also being provided with a groove of varying area on its inner surface and the ends of said cylinder being provided with a circular groove, with which extensions on the piston engage, substantially as described.

14. A casing for a gun, having the upper part made substantially circular in shape and provided with two grooves, one for the reception of an enlarged part of the gun and the other for the reception of a rack attached to said gun, projections on said casing adapted to receive a shaft for elevating and depressing said gun, said casing being also provided with journals, for the reception of the main axle and for the reception of the shaft of the recoil mechanism, substantially as described.

In testimony whereof I affix my signature in presence of two witnesses.

WILLIAM H. BEVANS.

Witnesses:
F. C. YEATES,
ADOLPH G. WOLF.